United States Patent [19]

Casey

[11] E Re. 30,436

[45] Reissued Nov. 18, 1980

[54] RIM CONSTRUCTION AND TOOL APPARATUS FOR SAFE TIRE INFLATION

[75] Inventor: Robert Casey, Tazewell County, Ill.

[73] Assignee: Caterpillar Tractor Co., Peoria, Ill.

[21] Appl. No.: 914,092

[22] Filed: Jun. 9, 1978

Related U.S. Patent Documents

Reissue of:

[64] Patent No.: 3,995,676
Issued: Dec. 7, 1976
Appl. No.: 626,422
Filed: Oct. 28, 1975

[51] Int. Cl.[3] ..... B60C 5/16

[52] U.S. Cl. ..... 152/310; 152/427

[58] Field of Search ..... 152/396, 405–410, 152/427; 301/63 D

[56] References Cited

U.S. PATENT DOCUMENTS

| | | | |
|---|---|---|---|
| 2,788,050 | 4/1957 | Jeune | 152/410 |
| 3,007,741 | 11/1961 | Brown | 152/405 |
| 3,121,455 | 2/1964 | Scott | 152/427 |
| 3,354,927 | 11/1967 | Pile | 152/410 |
| 3,459,252 | 8/1969 | Verdier | 152/410 |
| 3,599,698 | 8/1971 | Skehan et al. | 152/410 |
| 3,623,530 | 11/1971 | Beyers et al. | 152/410 |
| 3,882,919 | 5/1975 | Sons, Jr. et al. | 152/410 |

FOREIGN PATENT DOCUMENTS

| | | | |
|---|---|---|---|
| 2207226 | 4/1974 | Fed. Rep. of Germany | 152/410 |
| 1387154 | 3/1975 | United Kingdom | 152/410 |
| 132492 | 2/1960 | U.S.S.R. | 152/396 |

*Primary Examiner*—John J. Love
*Assistant Examiner*—D. W. Underwood
*Attorney, Agent, or Firm*—John W. Grant

[57] ABSTRACT

In a multi-piece rim arrangement having a tapered base member and an associated tire bead seat band, the bead seat band is constructed to prevent tire inflation if the rim is improperly assembled. Included is a portable puller tool, adaptable to existing rim assemblies, that functions to pull the bead seat band against the lock ring of the multi-piece rim arrangement with sufficient force to insure proper positioning of the various rim members and establish air tight integrity with a mounted tire.

3 Claims, 6 Drawing Figures

RIM CONSTRUCTION AND TOOL APPARATUS FOR SAFE TIRE INFLATION

Matter enclosed in heavy brackets [ ] appears in the original patent but forms no part of this reissue specification; matter printed in italics indicates the additions made by reissue.

BACKGROUND OF THE INVENTION

The size requirements for tires utilized in earth-moving equipment has reached the point where the wheel member for mounting the tire must be constructed of several pieces. Generally, such rim assemblies consist of a rim base member on which the tire is mounted. Also included are flange members radially extending outwardly from either end of the rim base member and against which the side wall of the mounted tire abuts.

It has been found advantageous in larger wheel-tire combinations to taper the rim base member outwardly at each end thus providing a tight non-slipping fit between the tire bead and the wheel assembly. Tire size has reached the proportion that at least one taper must be removable in order to conveniently mount and dismount the tire. The removable tapered bead seat band fits between the rim base member and an associated flange with taper at the opposite end of the rim base member adjacent the second flange integrally formed in the rim base member. Utilization of a tapered bead seat band requires a lock ring removably associated with the rim base member to retain the bead seat band and its associated flange member on the base member.

Inflation of a mounted tire, generally through an aperture in the rim base member in the vicinity of the removable tapered bead seat band, requires a seal member between the removable tapered bead seat band and the rim base member to maintain air tight integrity of the cavity formed by the tire mounted on the wheel assembly. Improper positioning of the bead seat band or improper location and partial seating of the lock ring around the rim base member presents a particular hazard on inflation of the tire member as the various parts of the multi-piece rim assembly may become disassociated and be catapulated with considerable force toward maintenance personnel involved in the assembly and inflation of the tire. Accordingly, various methods have been devised to insure the rim assembly is properly assembled before inflation may take place. Even with these various methods, it has been found advantageous to place the entire assembled tire and wheel assembly in a cage prior to inflation in the event the multi-piece rim assembly has been improperly assembled and the subsequent inflation will cause explosive disassembly of the parts. Although use of safety cages is advantageous, such safety cages in the larger tires are particularly cumbersome to utilize in field assembly of tires and wheels. Accordingly, to provide a wheel assembly for large earth-moving equipment which may be assembled with a tire in the field without the use of safety cage during tire inflation would be most desirable.

SUMMARY OF THE INVENTION

It is an object of this invention to provide improvement to a multi-piece rim assembly which allows inflation of a mounted tire only if the rim assembly is properly assembled.

It is another object of this invention, while fulfilling the above object, to provide improvements to existing multi-piece rim assemblies which are economical and easily accomplished.

It is still a further object of this invention to provide a simple portable tool which insures the rim members are properly assembled before inflation may take place.

Broadly stated, the invention is an improvement to a wheel assembly, the wheel assembly having a rim base member and flange members removably associated therewith and formed to have an inflatable tire mounted therebetween, the rim base member defining first and second annular grooves circumferentially oriented adjacent to one end, the first annular groove being proximate to the end. A lock ring is adapted to fit and is positionable in the first annular groove. A seal member is positionable in the second annular groove. A seal member is positionable in the second annular groove. The improvement is in the bead seat band mounted on the rim base member adjacent the first annular groove and overlying the seal member. The lock ring retains the bead seat band on the rim base. The improved bead seat band defines a plurality of radial ports, the radial ports sealed by the seal member to block communication between the interior of a mounted tire and atmospheric air only while the bead seat band is urged against the lock ring seated in the first annular groove.

BRIEF DESCRIPTION OF THE DRAWINGS

These and other objects of the invention will become apparent from a study of the following specification and drawings in which.

DETAILED DESCRIPTION OF THE PREFERRED EMBODIMENT

Figure 1:
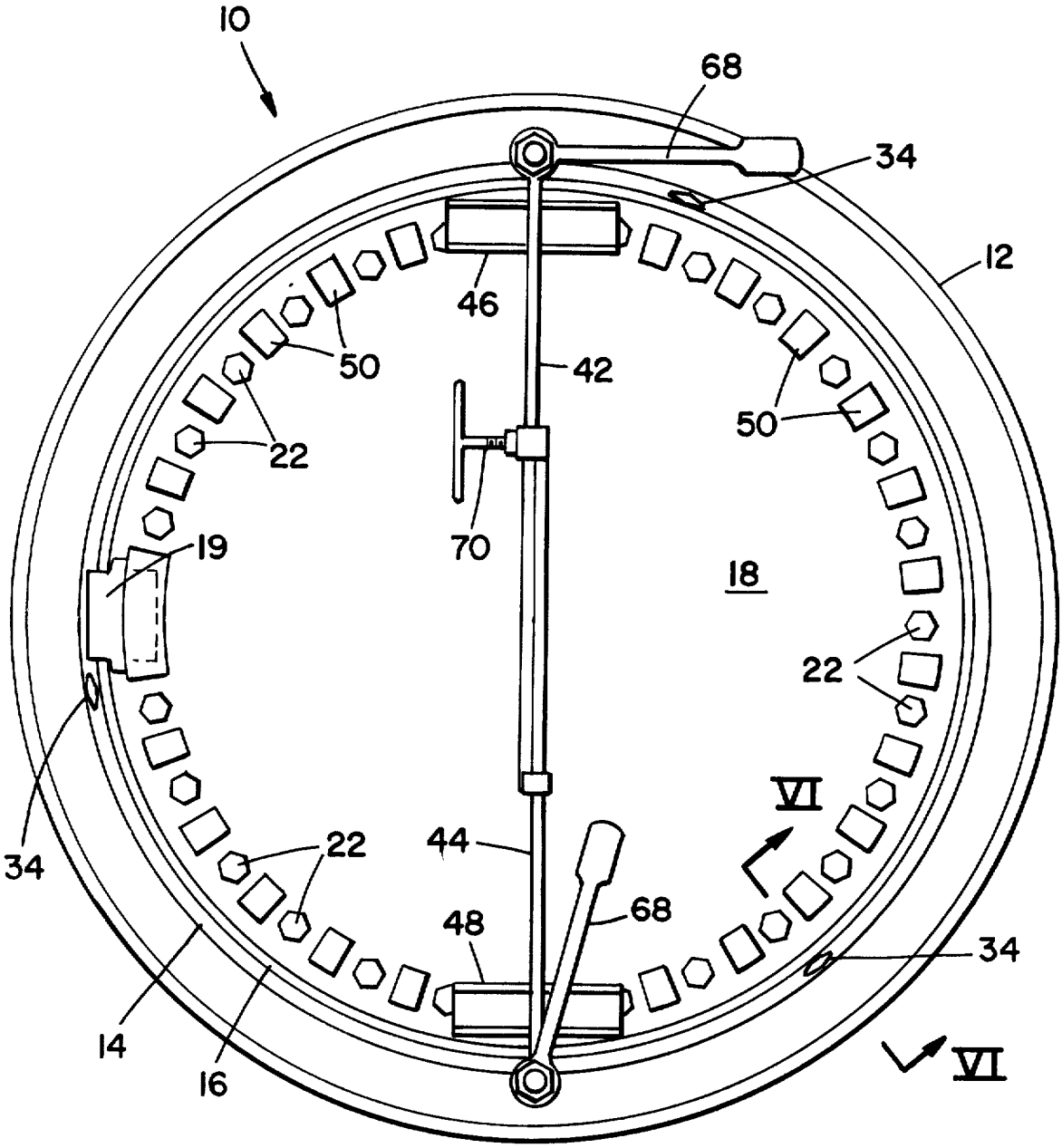
FIG. 1 is an elevation view of a representative multi-piece rim arrangement having mounted thereon the portable tool which is part of this invention.

Referring to FIG. 1, an elevation view of a multi-piece rim arrangement 10 for a heavy construction or earth-moving vehicle is shown, having a flange member 12, a bead seat band 14 and a lock ring 16. A cover 18 is provided for the multi-piece rim arrangement 10, which is retained on the rim base member 20 by a plurality of bolts 22. A driver 19 is provided to prevent slippage of the assembled arrangement particularly bead seat band 14.

Figure 2:
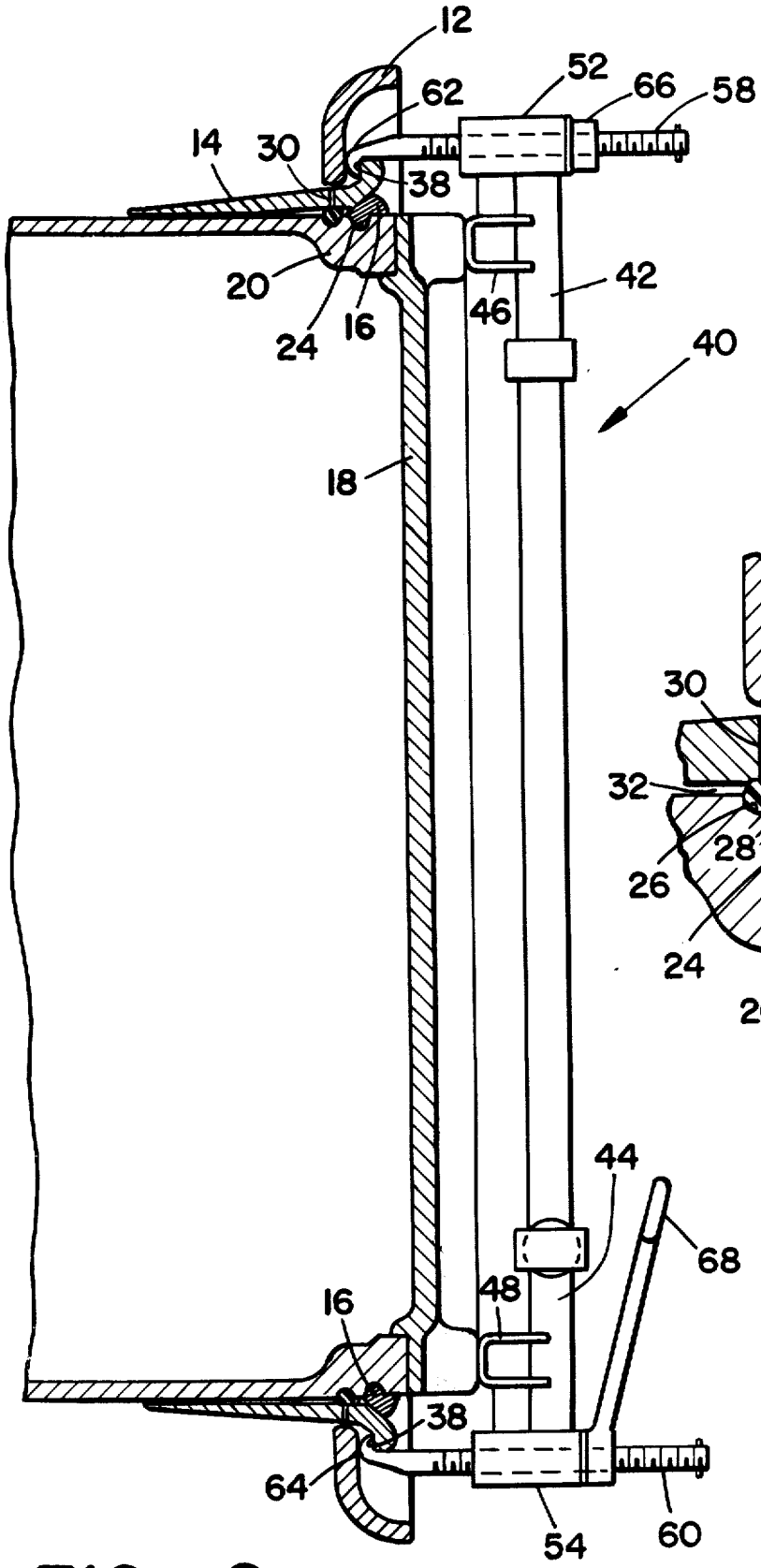
FIG. 2 is a side view partly in cross-section of a portion of the wheel arrangement showing the portable tool mounted thereon as illustrated in FIG. 1.
Figures 3, 4, 5:
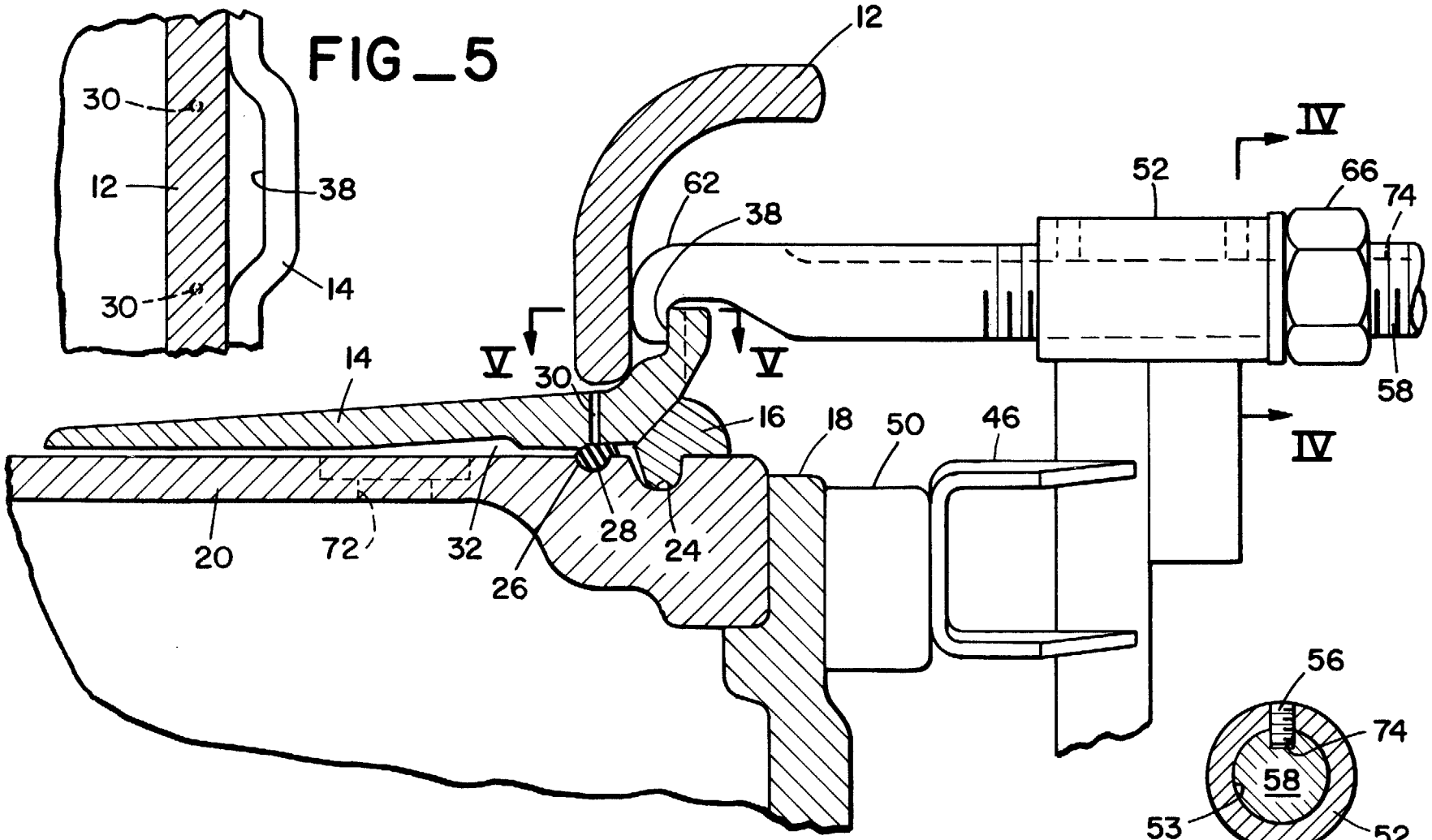
FIG. 3 is a detail view of one portion of FIG. 2 showing the relation of the bead seat band of this invention and the puller tool of this invention.
FIG. 4 is a cross-sectional view of the puller tool at lines IV—IV of FIG. 3.
FIG. 5 is a sectional view of the bead seat band and the flange member at V—V of FIG. 3.

Referring to FIG. 2, the multi-piece rim arrangement is shown in section. A second flange member (not shown) is positioned on rim base member 20 at the opposite end thereof to retain an inflatable tire (not shown) between flange member 12 at the one end of rim base member 20 shown in FIG. 2 and the second flange member (not shown) on the opposite end of rim base member 20. Bead seat band 14 is mounted on rim base member 20 and retained thereon by lock ring 16. Lock ring 16 being of a split ring configuration, is adapted to fit and is properly positionable in an annular groove 24 circumferentially oriented around the perimeter of rim base member 20 proximate the one end thereof. A second annular groove 26 is similarly circumferentially oriented around the perimeter of rim base member 20 inwardly of the first annular groove. Annular groove 26 is adapted to receive seal member 28, to insure integrity of the cavity formed by the tire mounted on the rim arrangement. Bead seat band 14 which overlays seal member 28 provides a seat for the mounted tire, and is tapered inwardly as indicated in FIG. 3 toward the center portion of rim base member 20. A matching tapered bead seat (not shown) is integrally formed at the opposite end of rim base member 20 adjacent the second flange member (not shown). A plurality of radial ports 30 are provided in bead seat band 14 adjacent to seal member 28. Radial ports 30 will communicate air contained in the cavity of the mounted tire to atmospheric air if bead seat band 14 is displaced leftwardly as shown in FIG. 3, air contained in the cavity of the mounted tire passing through space 32 formed by bead seat band 14 and rim base member 20, thence port 30 to escape between the mounted tire and flange 12 or between flange 12 and bead seat band 14.

Figure 6:
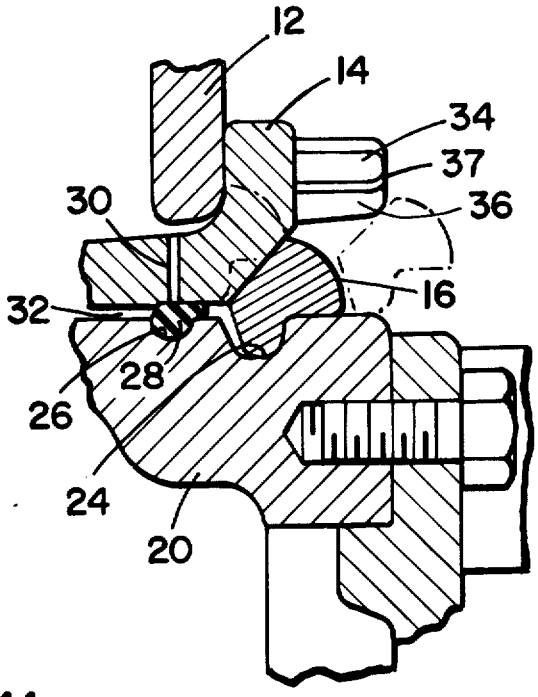
FIG. 6 is a sectional view of a portion of the multi-piece rim arrangement shown in FIG. 1 at VI—VI.

Referring to FIG. 6, bead seat band 14 is illustrated properly seated against lock ring 16, lock ring 16 being seated in annular groove 24. However, if lock ring 16 is displaced inwardly of rim base member 20 as shown by the leftward dotted lines depicting lock ring 16, bead seat band 14 would be similarly positioned leftwardly, allowing air to be vented through radial port 30 thus preventing proper inflation of the tire as long as lock ring 16 is not seated in annular groove 24.

Further, if lock ring 16 is displaced outwardly of rim base member 20 as shown by the rightward dotted lines depicting lock ring 16, bead seat band 14 would be similarly positioned rightwardly, allowing air to be vented through radial port 30.

Bead seat band 14 includes means for seating lock ring 16 comprising a plurality of protrusions 34 axially extending outwardly therefrom as shown in FIG. 6. A ramp portion 36 of each protrusion 34 acts to urge lock ring 16 into annular groove 24 if lock ring 16 is positioned leftwardly of annular groove 24. A face portion 37 of each protrusion 34 will urge lock ring 16 off rim base member 20 and cover 18 if lock ring 16 is positioned rightwardly of annular groove 24 as illustrated in FIG. 6. Ramp portion 36 is formed to clear lock ring 16 once lock ring 16 is properly seated.

Multi-piece rim arrangements currently available are provided with at least two slots 38 (see FIGS. 2 and 5), the slots 38 being diametrically opposed and primarily for the purpose of inserting a pry-bar therein to loosen flange 12 and the associated tire bead from bead seat band 14. A portable tool 40 utilizes slots 38 to urge bead seat band 14 outwardly against lock ring 16 and position bead seat band 14 over seal member 28 to seal ports 30. Portable tool 40 is comprised of telescoping members 42 and 44. Affixed at either end of portable tool 40 are support members 46 and 48 adapted to engage multi-piece rim arrangement 10 at a series of protrusions 50 circumferentially spaced around cover plate 18 and dispersed between the plurality of bolt members 22. Protrusions 50 protect bolts 22 from damage during operation of the earth-moving machine. Affixed to portable tool member 40 at the extreme ends are puller assemblies comprising guide sleeves 52 and 54, threaded rods 58 and 60 and nuts 66 engageable on threaded rods 58 and 60.

Guide sleeves 52 and 54 are cylindrical in form and have affixed therein pin members 56 extending inwardly of an axial bore 53 in guide sleeves 52 and 54. Slidably disposed in guide sleeves 52 and 54 are threaded rods 58 and 60, each having formed at one end a hook-shaped protrusion 62 and 64 adapted to fit in slots 38, the hook shaped protrusions 62 and 64 facing each other. An elongated groove or keyway 74 (see FIG. 4) receives pin members 56 to prevent rotation of threaded rods 58 and 60. Means for urging hook shaped protrusion 62 and hook shaped protrusion 64 inwardly of guide sleeves 52 and 54, respectively, are provided by nuts 66 threadably engaged on threaded rods 58 and 60. A socket-type wrench 68 may be utilized to provide torque to nut 66 and the associated nut located on threaded rod 60 to retract threaded rod 58 through guide sleeve 52.

Referring to FIG. 1, the telescoping members 42 and 44 may be rigidly spaced apart by means of a set screw arrangement 70 or any similar means of affixing the telescoping rods 42 and 44 one to the other.

In operation, the rim construction and tool apparatus is utilized as follows: The wheel arrangement is assembled as shown on FIG. 2, with flange member 12 mounted on bead seat band 14 adjacent to the plurality of radial ports 30. Bead seat band 14 is positioned on rim base member 20 with flange member 12 so mounted. An opposite flange (not shown) is positioned at the opposite end of rim base member 20. The tire mounted on rim base member 12 is retained between the two flange members. An inflation port 72 (FIG. 3) is provided in rim base member 20 for insertion of a conventional valve and valve stem member used to inflate pneumatic tires.

Referring to FIG. 1, portable tool 40 is fitted to bead seat band 14 at slots 38, as shown in cross-section in FIG. 2. Utilizing socket-type wrench 68, nut 66 on threaded rod 58 and the associated nut on threaded rod 60 are rotated to urge bead seat band 14 outwardly on rim base member 20. As described above, if lock ring 16 is inward of annular groove 24, ramp 36 will contact lock ring 16 forcing it into annular groove 24. However, if lock ring 16 has been positioned outward of annular groove 24, rotation of the nuts on threaded rods 58 and 60 will force lock ring 16 off rim base member 20 and cover 18, thereby preventing proper inflation of a tire mounted on the wheel arrangement by venting air through unsealed ports 30. If bead seat band 14 is not adequately pulled up against lock ring 16, as noted above, radial ports 30 will remain in communication with space 32; thus air inserted into the tire will be vented to atmospheric air through radial ports 30 around flange member 12. When bead seat band 14 is properly positioned as shown in FIG. 3, radial ports 30 are sealed by seal member 28 thereby preventing air from passing from space 32 through port 30 to atmospheric air.

Rotation of nut 66 would normally cause threaded rod 58 to rotate; however, threaded rod 58 as previously noted is provided with an elongated groove or keyway 74 (see FIG. 4) in which pin member 56 rides thereby preventing rotation of threaded rod 58. Threaded rod 60 is similarly provided with a keyway to prevent rotation.

It should be noted that the improvement disclosed herein is readily adaptable to bead seat bands available on the market. Such adaptation requires the drilling of the plurality of radial ports 30 and the addition of protrusions 34 to the bead seat band. Additionally, portable tool 40 is formed to be adapted to available commercial rims, the portable tool 40 providing proper register of the rim components.

What is claimed is:

1. In a multi-piece wheel assembly comprised of a rim base member, a pair of flange members removably associated at either end thereof and formed to have an inflatable tire mounted therebetween, the rim base member defining first and second annular grooves circumferentially oriented adjacent one end, said first annular groove proximate said end, and a lock ring removably adapted to fit and positionable in said first annular groove and a seal member positioned in said second annular groove, the improvement comprising:

a bead [set] *seat* band formed to receive one flange member and mountable on said rim base member inwardly of said first annular groove and overlying said seal member, said lock ring [while] *being* seated in said first annular groove for retaining said bead seat band on said rim base member *said bead seat band being spaced from said rim base member defining a space therebetween in communication with the interior of the mounted tire;* said bead seat band defining a plurality of radial ports *adjacent said one flange member* to communicate *the space and hence* the interior of [a] *the* mounted [inflated] tire with atmospheric air *between the flange member and the bead seat band when the radial ports are not sealed by the seal member*, said ports sealed by said seal member to block said communication between the interior of said mounted tire and atmospheric air only while said bead seat band is urged against said lock ring seated in said first annular groove.

2. The improvement as set forth in claim 1 wherein said bead seat band includes means to properly position said lock ring.

3. The improvement as set forth in claim 2, wherein the means to properly position said lock ring comprise a plurality of protrusion integrally formed with said bead seat band and axially extending therefrom, each protrusion having a ramp portion, said ramp portions formed to engage the outer perimeter of said lock ring positioned in the first annular groove to urge said lock ring inwardly of said annular groove to properly position said lock ring, said protrusion further having a face portion defining a surface forming on obtuse angle with said ramp portion, said surface oriented in a radial plane and formed to engage said lock ring while said lock ring is disposed around the rim base member and is displaced from said annular groove.

* * * * *